(12) United States Patent
Bengston et al.

(10) Patent No.: US 6,997,656 B2
(45) Date of Patent: Feb. 14, 2006

(54) DEVICE AND ASSEMBLY FOR HOLDING AN OBJECT

(75) Inventors: Richard C. Bengston, Columbia, NH (US); Peter Schmidt, Bolton, CT (US); Robert Michael Dickson, Coventry, CT (US)

(73) Assignees: Bengston Tool + Die Co., Inc., Columbia, NH (US); The Hermann Schmidt Company Inc., East Hartford, CT (US)

( * ) Notice: Subject to any disclaimer, the term of this patent is extended or adjusted under 35 U.S.C. 154(b) by 107 days.

(21) Appl. No.: 10/622,252

(22) Filed: Jul. 18, 2003

(65) Prior Publication Data

US 2005/0013675 A1   Jan. 20, 2005

(51) Int. Cl.
   *B23B 31/18*   (2006.01)
(52) U.S. Cl. ......................... 409/225; 279/106; 157/17
(58) Field of Classification Search ................ 409/225, 409/903; 279/33, 34, 35, 106, 109, 2.24; 157/17, 16
   See application file for complete search history.

(56) References Cited

U.S. PATENT DOCUMENTS

| | | | | | |
|---|---|---|---|---|---|
| 2,723,861 | A | * | 11/1955 | Eisler | 279/106 |
| 2,980,434 | A | * | 4/1961 | Hoffman | 279/106 |
| 3,912,287 | A | * | 10/1975 | Steinmetz | 279/35 |
| 4,250,936 | A | * | 2/1981 | du Quesne | 157/17 |
| 4,316,614 | A | * | 2/1982 | Clopton | 279/136 |
| 4,819,527 | A | * | 4/1989 | Redman | 82/165 |
| 4,828,276 | A | * | 5/1989 | Link et al. | 279/33 |
| 5,215,507 | A | * | 6/1993 | Bonig | 279/33 |
| 5,335,922 | A | * | 8/1994 | Unate | 279/9.1 |
| 5,509,336 | A | * | 4/1996 | Biagiotti | 279/109 |

* cited by examiner

*Primary Examiner*—Boyer D. Ashley
*Assistant Examiner*—Dana Ross
(74) *Attorney, Agent, or Firm*—Michael J. Persson; Lawson + Persson, PC

(57) ABSTRACT

A device for holding an object, and an assembly for holding and rotating an object. The device includes a base, a series of posts, each of which is equidistant from a center point of reference and further pivotably holds a follower rotationally linked to all other followers. Each follower has a gripping portion dimensioned to hold an object. An actuator serves to displace the followers radially about the post holding it creating a motion that causes the gripping portions to move either towards or away from the center reference point, dependent upon the displacement of the actuator. As all followers are rotationally linked, each follower of the device rotates to a substantially equal degree.

18 Claims, 5 Drawing Sheets

DEVICE AND ASSEMBLY FOR HOLDING AN OBJECT

FIELD OF THE INVENTION

The present invention relates to the field of fixtures and tool holders and, in particular, to the field of fixtures and tool holders for holding workpieces in reliable alignment.

BACKGROUND OF THE INVENTION

The high fixed costs associated with modern manufacturing processes provide a strong incentive for reducing downtime in industrial applications. Furthermore, today's manufactured components must be produced to more exacting tolerances than were previously required. Accordingly, manufacturers must produce larger quantities of high quality parts in order to compete in today's marketplace.

Workpiece-holding fixtures are an integral part of many fabrication processes. Work-holding fixtures keep a workpiece in place through locating and clamping during a machining operation. The term "workpiece" is to be understood to include both objects that require work and tools that perform workshop-machining work. Both positional accuracy and clamping force repeatability contribute to efficiency and quality improvement as they directly contribute to reduction in production cycle times. Thus, the ability to quickly and accurately position and clamp components into a fixture, and to quickly remove them after machining, factors greatly in the productivity of many processes.

Quick and accurate clamping is likewise required when holding a cutting tool during machining. Current popular cutting implements, such as drill bits, milling cutters, or the like, utilize round shafts that are grasped and rotated about an axis. Regardless of the cutting implement employed, it is necessary to have these cutting implements operate substantially perpendicularly to the rotating tool that is holding it. Thus, these stringent alignment requirements fall to the device to which the tool attaches. Devices commonly used to hold round-shafted workpieces in current conventional production include chucks, collets and V-blocks.

Chucks are typically cylindrically shaped devices with two, three or four moveable jaws. The common chuck is a three-jaw gear chuck, which has three jaws inclining by one-hundred and twenty degrees (120°) about the circumference. These jaws are spaced at intervals for engaging with a threading cone by means of a nut, whereby each jaw may sliding obliquely along the threads in the nut for extending or retreating. The nut is controlled by the wrench of an umbrella gear on the chuck for chucking or releasing the workpiece.

Chucks are beneficial because they allow the user to accommodate a fairly wide range of shaft sizes and, consequently, to quickly change tools between operations. However, conventional chucks are poorly suited to applications requiring precise tolerances, as the stack tolerances on the many adjustable parts of the chuck mechanism make it inherently inaccurate at centering the shaft to be rotated. When a rotating shaft is not centered, it displays what is termed as "run-out". Run out is orbital or rotational movement at the object's end furthest from the spinning device, causing holes to be larger and/or elliptical in shape, and causing inaccuracies in milling operations.

Run out is not a problem relegated solely to cutting implements. Many operations require a spinning workpiece, for example lathe work. Once again, inaccuracies surface, as any play in the lathe chuck contributes to run out. In their fabrication, lathe chucks typically have extra assembly considerations for which a manufacturer must compensate. Many conventional lathe chucks are composed of distinct removable jaws that fit onto a spiral-shaped worm gear one jaw at a time. To operate the lathe chuck, the spiraled worm gear must accommodate the first jaw, then the worm gear must be rotated until its single tracked opening reached another jaws position on the chuck assembly. This continues until all of jaws are on the gear. As the jaws can only be attached one at a time and the worm gear constantly rotates during the assembly, the jaws that are attached first approach the center more rapidly than ones subsequently attached. To compensate for this imbalance, lathe chuck manufacturers typically insert a grinder into the gripping portion of the jaws of the fully assembled chuck and grind the jaw surfaces until each jaw surface is equidistant from a point in their center. Thus, accurate workpiece centering is directly related to grinding accuracy.

In addition to inaccuracies caused by grinding, additional inaccuracy is introduced by the necessary play between the jaw and the worm gear that drives it. As previously described, worm gears have a spiral track onto which the jaws fit. Since the jaws have a grip that must slide along this track, there must be enough space between the grip and the track so as to allow a smooth slide towards the final chuck assembly position. This space creates play, which causes the assembled chuck to display operational run out.

Collets are typically used in applications were precision is required. A collet is a ring, band, or collar that is included as one of the components in a machine-tool holder. The collet is the component of the chuck that grips and releases a workpiece. Collets hold a round shaft more completely around, but have a more limited range, for example $\frac{1}{8}"+/-\frac{1}{32}"$ or $\frac{1}{4}"+/-\frac{1}{16}"$. These are generally used because common tool shafts are manufactured in specific sizes, and because greater precision may be obtained than could otherwise be realized by using conventional chucks. However, collets are not adapted for use with a variety of shaft diameters and, accordingly, must be removed and replaced whenever a different tool is needed. Replacing a collet takes a significant amount of time. Unlike chucks, the entire collet is taken from a machine during the change. After it is unscrewed, its replacement must be screwed into place, the shaft must be properly placed and then the collet is retracted into the machine. Retracting the collet presents most of the alignment problems associated with collets as during this process the machine contracts the collet's frustum shape causing it to grip the shaft. Retracting either too much or too little affects the collet's surface area gripping the bit, causing the tool to run out. Furthermore, collets are built to hold very specific sizes of shafts and even minute variations can cause run out as well.

A V-block is a conventional accessory for holding a workpiece in surface grinding work. A V-block often includes two major components: a block having a finely ground channel at a specified angle, and a clamp positioned directly above the channel. V-blocks can typically hold round, square or irregularly shaped workpieces. Unfortunately, the same versatility that allows the V-block to hold these various shapes prevents it from having direct rotational stability when attached to a spin jig. Because the work object must be placed in the center of the spin jig's rotation, the often heavy V-block must be placed to one side with the often lighter clamp on the other side. This weight disparity can cause substantial run out, especially on smaller spinning mechanisms. Additionally, the V-block must be adjusted based on the size of the workpiece. Larger workpieces will necessarily require that the V-block be positioned farther to the side and vice versa. To mitigate such a problem, a spinning mechanism need possess variable means to hold the V-block.

Therefore, there is a need for a device that can easily, quickly and effectively hold a variety of workpieces having varying widths, yet still maintain the shaft in a substantially aligned position relative to itself; and that may be attached to a spinning element to create a spinning assembly with minimal run-out.

SUMMARY OF THE INVENTION

The present invention is a device for holding a workpiece, and an assembly for holding and rotating a workpiece that utilizes the device. A basic form of the device for holding a workpiece includes a base, a series of posts, each of which pivotably holds a rotationally-linked follower having a gripping portion, and an actuator for displacing the followers. Each post should be approximately equidistant from a center reference point. Displacing the actuator exerts a force upon the followers causing each follower to rotate synchronously and to a similar degree about the post that holds it. The preferred means for ensuring synchronous rotation uses linkages between adjacent followers to ensure that each follower of the device rotates to a substantially equal degree, causing the gripping portions to move either towards or away from the center reference point, dependent upon the direction of displacement of the actuator.

In a preferred embodiment, a screw acts as the actuator to rotate linked substantially rigid followers about their respective posts. In this preferred embodiment, each follower includes a pin-shaped gripping portion that is disposed upon the follower such that movement of the pin-shaped gripping portion inward toward the center reference point causes the outer surface of each pin to engage and grip the object. The preferred embodiment also includes a locking means for locking the actuating screw in a fixed position to prevent unwanted backing off of the actuating screw during operation.

In basic form, the assembly for engaging and rotating a workpiece includes the device for engaging a workpiece and a means for rotating the device, to which the device is attached. The device is attached to the means for rotating the device such that the center reference point of the device is aligned with a center reference point of the means, causing the device and means to rotate about a common center reference point. Preferably, the spinning means is a spin jig, such as those commonly used to grind shafts to a uniform diameter. However, in other embodiments, this means is lathe, drill press, milling machine, or other art recognized means for rotating a workpiece.

Therefore, it is an aspect of the present invention to provide a device that can easily, quickly and effectively hold a variety of workpieces having varying dimensions.

It is a further aspect of the present invention to provide a device that can centrally align an object relative to itself.

It is a further aspect of the present invention to provide a device that may be attached to a spinning element to create a spinning device capable of rotating an object with minimal run out.

It is a further aspect of the present invention to provide an assembly capable of holding a workpiece and spinning it with minimal run out.

It is a further aspect of the present invention to provide an assembly capable of combining with modern machining equipment such as lathes, drill presses, milling machines, grinders, EDM equipment and the like.

These aspects of the invention are not meant to be exclusive and other features, aspects, and advantages of the present invention will be readily apparent to those of ordinary skill in the art when read in conjunction with the following description, and accompanying drawings.

DETAILED DESCRIPTION OF THE INVENTION

Figure 1:
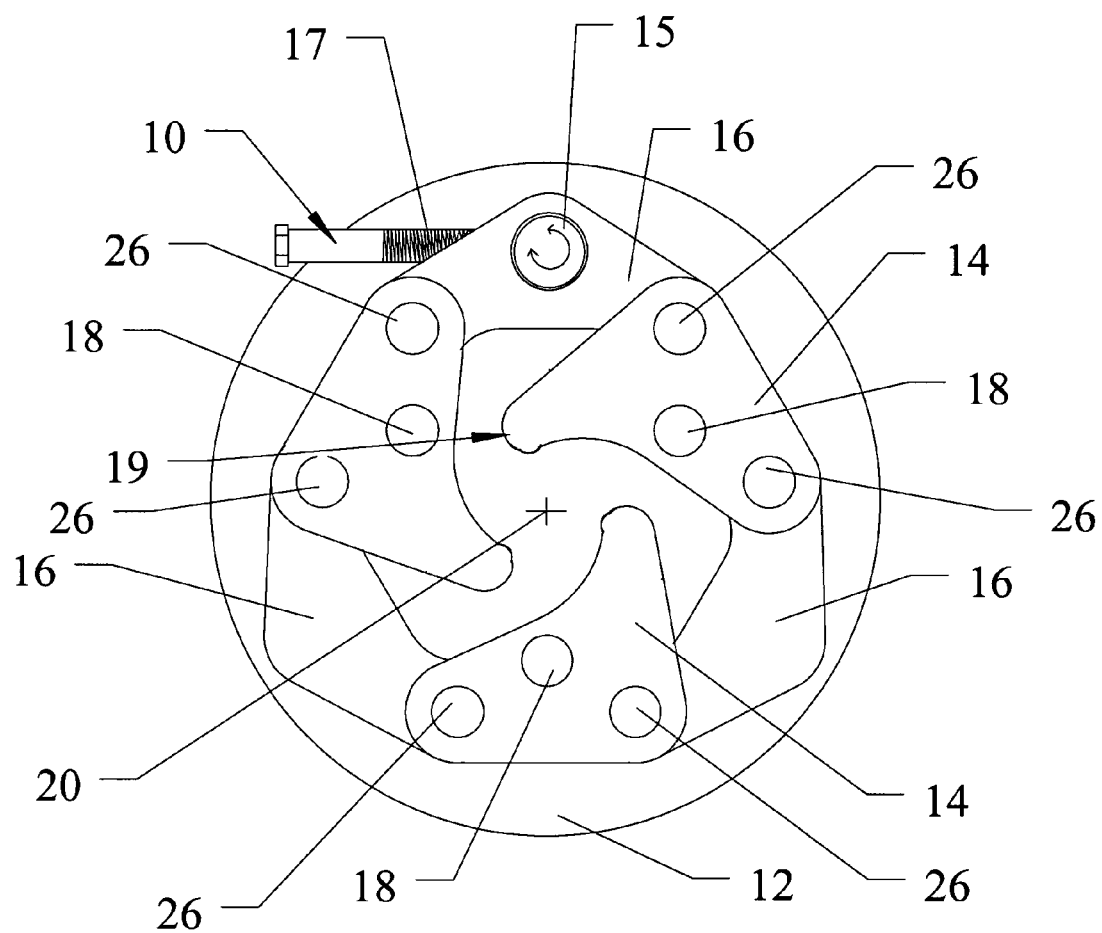
FIG. 1 is a front view of the preferred embodiment of the device for holding a workpiece.

Referring first to FIG. 1, the basic embodiment of the device 11 for holding a workpiece is shown. The workpiece to be used in conjunction with the present invention could be either an object that requires work or a tool that performs work, i.e. machining, milling, bending, straightening, restraining, grinding, cutting, or any other machining scenario in which equipment needs to be held in a substantially aligned position.

A basic embodiment of the device 11 includes a base 12, and a series of posts 18 upon which rotationally-linked followers 14 are pivotably mounted and a plurality of linkages 16 linking each follower 14 to the other followers 14. Each follower 14 includes an end section that acts as a gripping portion 19 for gripping the workpiece (not shown). An actuator 10 is in mechanical communication with the followers 14 such that the movement of the actuator 10 causes each follower 14 to rotate simultaneously about its respective post 18.

The posts 18 are spread about, and attached to, the base 12 so as to be substantially equidistant from a center reference point 20. This center reference point 20 is not an affirmative element of the present invention as much as it is simply a reference point. Upon each post 18, sits a follower 14. The embodiment of FIG. 1 has three followers 14 and three posts 18, but this purely illustrative and a device having four or more followers 14 and posts 18 would work as well. Thus, the number of posts 18 and followers 14 is a matter both of preference and cost and not a mechanical necessity of the invention The rotationally linked followers 14 shown in FIG. 1 each possess a distorted triangle shape, which is preferred for its efficient use of space, balance and gripping concerns. However, one skilled in the art would understand that the shape is a matter of efficacy, and that any shape possessing a distinct gripping area would be acceptable for purposes of functionality. The preferred followers 14 are constructed of a rigid material, such as hardened stainless steel, in order to provide the device 11 with the necessary ruggedness for industrial use. However, other embodiments may utilize other materials such as composites, depending upon the use.

In the embodiment of FIG. 1, the end section of each follower 14 is disposed closest to the center reference point 20 and serves as the gripping portion 19 for gripping the workpiece (not shown). In this embodiment, the gripping portion 19 is merely an irregularity in the shape of the follower 14 on the side that is most proximate to the center reference point 20, so as to allow the device 11 to grip a workpiece without the workpiece impeding a follower's rotational progress. As described below, other embodiments of the invention utilize separate gripping portions 19 that are attached to the followers 14. However, regardless of what form they take, the gripping portions 19, much like the posts 18, need to be located as substantially equidistant from the center reference point 20 as machining allows.

The gripping portions 19 are preferably made of stainless steel. One advantage of this material is that it is highly resistant to frictional wear. A second advantage is its resistance to water. Water resistance is especially important, as many cutting fluids are water based. Gripping portions having rust could lose gripping accuracy by either material degradation or mobility loss. However, it is important to note that the types of materials used for constructing the gripping portions 19 are many and varied. For example, sapphire or composite gripping portions 19 might be desirable in applications utilizing welding in order to lessen conductivity concerns.

The gripping portion 19 of the present invention may be either a distinct entity affixed to the follower 14 or it may be a mere irregularity in the shape of the follower 14 dimensioned to grip a workpiece. In embodiments having followers 14 without distinct gripping portions, certain embodiments thereof include removable followers 14. These removable followers 14 allow a user to exchange followers 14 of one shape and/or material for followers possessing a second shape and/or material. It is recognized that this would be advantageous in situations where specifically shaped followers 14 would be more adept at holding specific workpiece shapes, or when specific materials allow more efficient machining. For example, a follower 14 having a gripping portion 19 that reliably holds a cylindrical or workpiece might not hold a hexagonal or triangular workpiece with the same reliability. With this in mind, other distinct gripping portion 19 embodiments display a feature utilizing interchangeable gripping portions 19 attached to affixed followers 14.

Having followers 14 rotationally linked ensures that the followers 14 maintain the gripping portions 19 substantially equidistant from a center reference point both during and after movement. The rotational linkage of the present invention keeps each follower 14 angled in a similar manner to all other followers 14. Such rotational uniformity may be achieved by using a pressured system such as hydraulics or pneumatics, a rack and pinion or other art recognized means. However, the preferred means for ensuring rotational uniformity is a system of physical linkages 16.

The embodiment of FIG. 1 features linkages 16 that allow all followers 14 to move in synchronous motion and, preferably, provide a physical connection to adjoining followers 14. The preferred linkage 16 spans the distance from one portion of a follower 14 to another portion of a second follower 14. As any follower 14 of the device 11 moves, the extreme ends of each linkage 16 pivots upon its respective followers causing all other followers 14 move substantially in unison. As the followers 14 rotate in unison, the gripping portions 19 move either inward or outward an equally proportional distance. As pictured, the linkages 16 attach their respective followers 14 via linkage attachments 26. Linkage attachments 26 are preferably posts that extend through holes in the followers 14 and linkages 16 and are captured therein such that the holes remain concentric while allowing the followers 14 and linkages 16 to rotate thereabout.

The device 11 has an actuator 10 positioned to act upon a linkage 16 or follower 14 to cause it to rotate. As shown in FIG. 1, the preferred actuator 10 is a threaded fastener 17 that mates with a nut 15 captured within an opening through one of the linkages 16 and rotatable therewithin to allow the fastener 17 to maintain its angular relationship with the base 12 when the linkage 16 rotates. In some such embodiments, the threaded fastener 17 is a micrometer screw to allow precise adjustment of the location of the gripping portions 19. Similarly, in embodiments in which vibration is likely, a set-screw is utilized to hold the threaded fastener in position after the workpiece is secured.

Although the actuator 10 of FIG. 1 is a threaded fastener 17, it is recognized that the actuator 10 may take many forms. For example, in some embodiments the actuator 10 is a rack and pinion, in others a hydraulic or pneumatic piston. In others, it is a cam that actuates a follower. While still other embodiments utilize a ratchet and pawl assembly. Accordingly, the actuator 10 should not be seen as being limited to the preferred threaded fastener 17, but rather should encompass any art recognized means for moving the linkages 16 or followers 14 in the manner described herein.

The actuator 10 may physically displace the linkage 16 or follower 14 by directly attaching to and moving either a follower 14, one of the linkages 16 or both simultaneously. Attaching to any of these options results in the same outcome; i.e. radial displacement of the followers 14 causing inward/outward movement of the gripping portions 19.

Figure 2A:
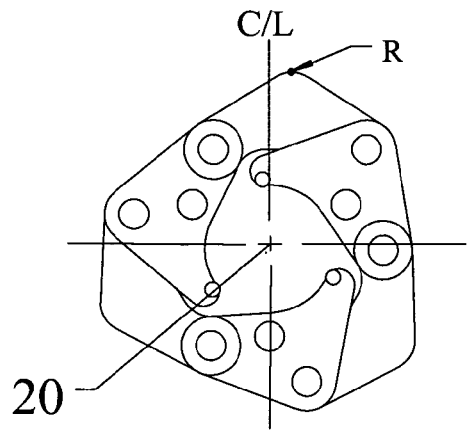
FIG. 2A is a front view of the device of the present invention with the base omitted and the gripping portions in a fully opened position.
Figure 2B:
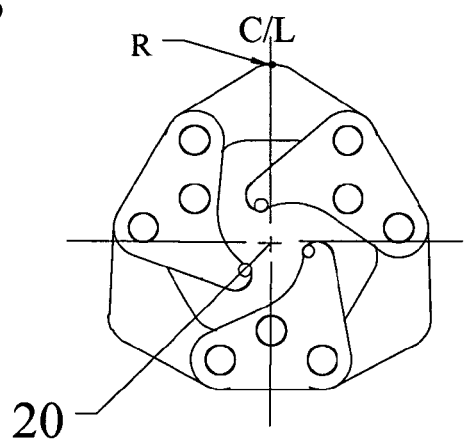
FIG. 2B is a front view of the device of FIG. 2A with the gripping portions in a halfway opened position.
Figure 2C:
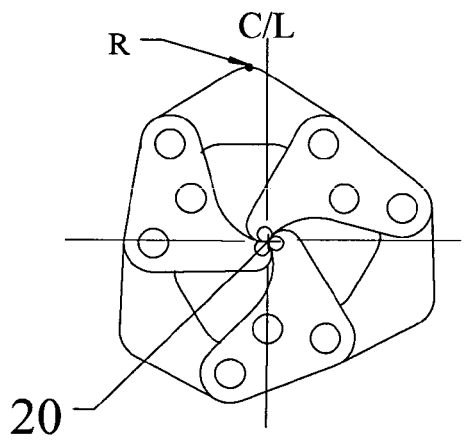
FIG. 2C is a front view of the device of FIG. 2A with the base omitted and the gripping portions in a fully closed position.

Referring now to FIGS. 2A–2C, the operation of the device 11 is demonstrated. As shown in FIG. 2A, the device 11 is in a fully open position with a reference point R to the right of the centerline C/L extending through center reference point 20. As shown in FIG. 2B, an input from the actuator causes the followers 14 and linkages 16 to move counterclockwise, closing the gripping portions 19 of each linkage a substantially equal distance from the center reference point 20. As shown in FIG. 2C, further counterclockwise rotation of reference point R results in the gripping portions contacting one another at the center reference point 20 such that the device 11 is fully closed.

Figure 3:
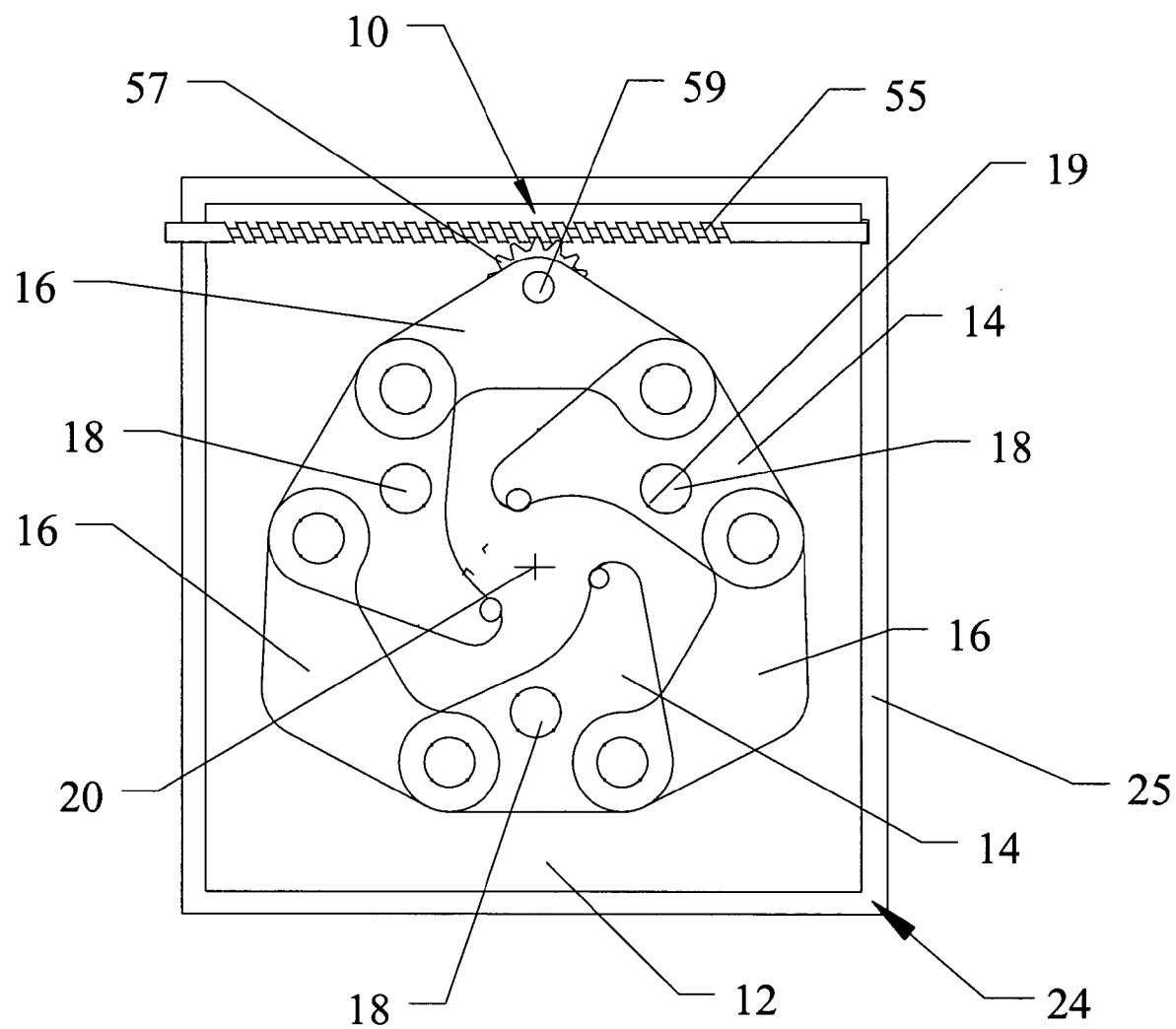
FIG. 3 is a front view of the one embodiment of the device for holding a workpiece.

FIG. 3 is a front view of another embodiment of the device 11. The device 11 of this embodiment is similar in many respects to that of FIG. 1, and includes the same arrangement of linkages 16, posts 18 and followers 14. However, the embodiment of FIG. 2 has a number of differences from the embodiment of FIG. 1.

First, the embodiment of FIG. 3 utilizes a square housing 24 having a base 12 from which sides 25 extend, and a top cover (not shown) that attaches to the sides 25. The top cover has an opening therethrough to allow an object to be held by the gripping portions 19. The inclusion of a housing 24 is preferred as it may serve as location for clamps that attach to a spin fixture and it further shields the rotational components of the present invention from debris and dust. The housing 24 is preferably constructed of stainless steel due to its dimensional stability and corrosion resistance. However, it may be manufactured from a variety of materials, and such interchangeability would be readily recognized by those in the tool making arts. Further, although the housing 24 of the embodiment of FIG. 3 forms a substantially square polygon, which is easily adapted for use with clamps or the like, it is recognized that it could take other forms, such as a cylinder, irregular polygon, or the like, depending upon the application in which it is used.

FIG. 3 also shows the preferred gripping portions 19, which take the form of pins that are joined to the ends of the followers 14. The grip pins 19 are preferably constructed of a material such as carbide or stainless steel, sapphire, brass or the like, depending upon the requirements of the applications. Most industrial applications will feature embodiments using grip pins 19 constructed of a non-deforming material. However, in other though applications, such as those in which scratches or surface deformations on the workpiece are to be avoided, a deforming material such as brass would be advantageous.

Finally, the actuator 10 of the embodiment of FIG. 3 is made up of a drive screw 55 that mates with a gear 59 rotatably mounted to one of the followers 16. In this arrangement, the rotation of the drive 55 screw in one direction causes the gripping portions 19 to move toward the center reference point 20, while rotation in an opposite direction causes them to move away from the center reference point 20.

Figure 4A:
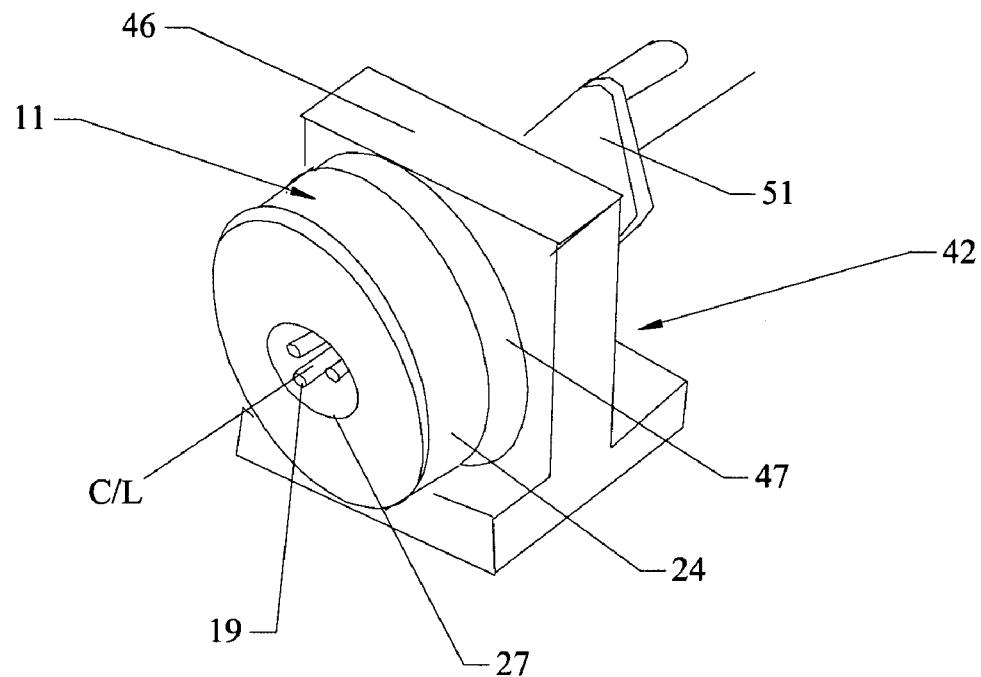
FIG. 4A is a side isometric view of one embodiment of the assembly for holding and rotating a workpiece.
Figure 4B:
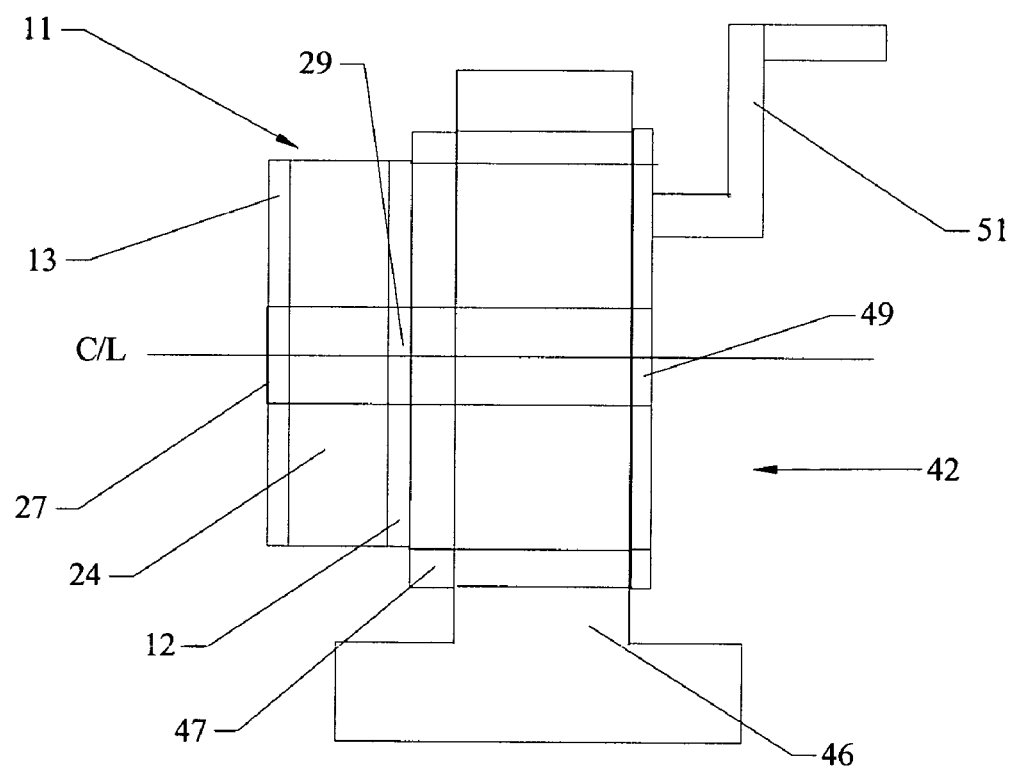
FIG. 4B is a cut away side view of the embodiment of the assembly shown in FIG. 4A with all components of the device removed from the housing.

FIGS. 4A and 4B shows the one embodiment of the assembly 40 for engaging and rotating an object (not shown), which includes the device 11 for engaging an object attached to spinning means 42, here a conventional spin jig. A spin jig 42 typically includes a base 46 into which is mounted a rotating spindle 47 having a set of high precision bearings that allow the spindle 47 to rotate about a central axis C/L. The device 11 is attached to the spindle 47 of the spin jig 42 such that each rotates about the common central axis C/L.

As shown in FIGS. 4A and 4B, the housing 24 of the device 11 includes and opening 27 through the cover 13 that is substantially concentric with the central axis C/L and provides access to the gripping portions 19, here extended pins. The use of extended pins as the gripping portions 19 is advantageous as it allows the device 11 to grasp the inside surface of a bore and to locate the workpiece (not shown) based upon the centerline of the bore. However, as noted above, the gripping portions 19 may take many forms.

In the embodiment of FIGS. 4A and 4B, openings 29, 49 are likewise disposed through the base 12 of the device 11 and through the spin jig 42, respectively. This arrangement allows long parts to be inserted into the assembly, and is the preferred arrangement in applications of the assembly where automated feed of objects is desired.

The spin jig 42 of FIGS. 4A and 4B likewise includes a handle 51 for manually spinning the spindle 47 about its axis. However, it is understood that the spinning of the spindle 47 is readily automated using conventional motor and pulley systems, electric motors, or the like.

Figure 5:
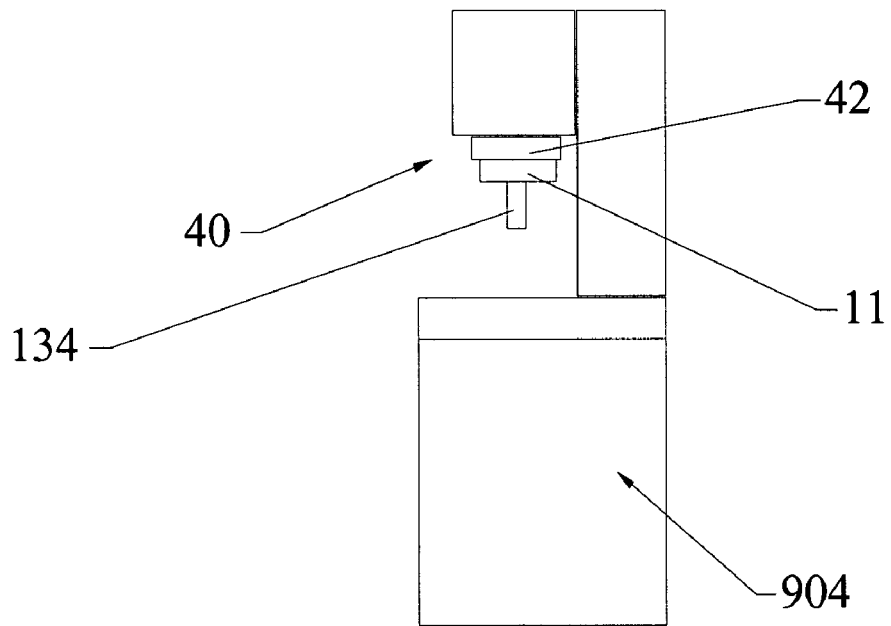
FIG. 5 is side view of the one embodiment of the assembly for holding and rotating a workpiece in which the device is a tool holder and the spinning means is a milling machine.
Figure 6:
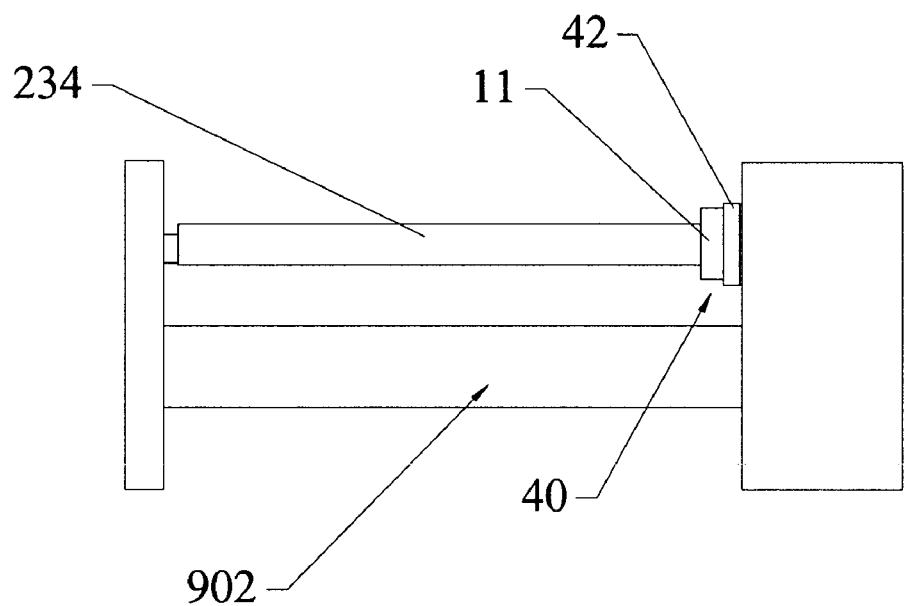
FIG. 6 is a side isometric view of the one embodiment of the assembly for holding and rotating a workpiece in which the device is a workpiece holder and the spinning means is a lathe.

Referring now to FIGS. 5 and 6, it is recognized that the assembly 40 of the present invention is not limited to the combination of the device 11 with a spin jig, as shown in FIGS. 4A and 4B. For example, FIG. 5 illustrates the use of the assembly 40 in which the device 11 is used as a toolholder for a machine tool, such as a milling machine 904. Such an assembly 40 includes the spinning means 42, which is part of the milling machine 904, and the device 11 attached thereto. In such an application, the device 11 is adapted to hold a milling cutter 134, drill bit or other tool commonly used in such applications and would allow an operator to relatively quickly attach a tool needed to operate with minimal run out. Similarly, FIG. 6 shows an assembly 40 in which the device 11 is used to hold a workpiece 234 in a lathe 902. As was the case with the milling machine, the device 11 is attached to the spinning means 42, which is integral to the lathe 902, and replaces the conventional lathe chucks described above.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A device for holding an object, said device comprising:
    a base;
    at least three posts affixed to and extending from said base, said posts disposed substantially equidistant from a center reference point;
    at least three followers, wherein each of said followers is pivotably attached to one of said posts and comprises a gripping portion for gripping the object,
    at least three linkages dimensioned to rotationally link each of said followers such that movement of one of follower causes all of said followers to pivot synchronously; and
    an adjustable actuator in communication with said followers, said actuator being shaped and dimensioned to cause said followers to rotate about said posts;
    wherein said actuator comprises a nut rotationally attached to one of said linkages and a threaded fastener disposed in communication with said nut; and
    wherein said followers and linkages are dimensioned and disposed such that a movement of one follower causes each of said followers to pivot in unison about said posts such that said gripping portions remain in substantially equidistant relation from the center reference point regardless of a degree of rotation of said followers.

2. The device of claim 1 wherein each of said gripping portions is a non-deforming pin attached to each of said followers.

3. The device of claim 2 wherein each pin is removably attached to each of said followers.

4. The device of claim 2 wherein each of said pins is dimensioned to grip an inside diameter of a bore.

5. The device of claim 1 further comprising a housing extending from said base, said housing comprising at least one side wall and a cover.

6. The device of claim 5 wherein each of said cover and said base comprise an opening therethrough, said opening having a centerline that is substantially aligned with the center reference point.

7. An assembly for holding and rotating an object, said assembly comprising:
    a device for holding an object, said device comprising:
        a base;

at least three posts affixed to and extending from said base, said posts disposed substantially equidistant from a center reference point;

at least three followers, wherein each of said followers is pivotably attached to one of said posts and comprises a gripping portion for gripping the object, at least three linkages dimensioned to rotationally link each of said followers such that movement of one of follower causes all of said followers to pivot synchronously; and an adjustable actuator in communication with said followers, said actuator being shaped and dimensioned to cause said followers to rotate about said posts;

wherein said actuator comprises a nut rotationally attached to one of said linkages and a threaded fastener disposed in communication with said nut; and wherein said followers and linkages are dimensioned and disposed such that a movement of one follower causes each of said followers to pivot in unison about said posts such that said gripping portions remain in substantially equidistant relation from the center reference point regardless of a degree of rotation of said followers; and spinning means for attaching to and spinning said device about an axis extending through said center reference point.

8. The assembly of claim 7 wherein each of said gripping portions is a non-deforming pin attached to each of said followers.

9. The assembly of claim 7 further comprising a housing extending from said base, said housing comprising at least one sidewall and a cover.

10. The device of claim 9 wherein each of said cover and said base comprise an opening therethrough, said opening having a centerline that is substantially aligned with the center reference point.

11. The assembly of claim 7 wherein said spinning means is a spin jig.

12. The assembly of claim 7 wherein said spinning means is a machine tool selected from a group consisting of a milling machine, drill press and a lathe.

13. A device for holding an object, said device comprising:

a base;

at least three posts affixed to and extending from said base, said posts disposed substantially equidistant from a center reference point;

at least three followers, wherein each of said followers is pivotably attached to one of said posts and comprises a gripping portion for gripping the object, wherein each of said gripping portions is a non-deforming pin attached to each of said followers;

at least three linkages dimensioned to rotationally link each of said followers such that each of said followers is directly connected to at least two linkages and movement of one of follower causes all of said followers to pivot synchronously; and an adjustable actuator in communication with said followers, said actuator being shaped and dimensioned to cause said followers to rotate about said posts;

wherein said followers and linkages are dimensioned and disposed such that a movement of one follower causes each of said followers to pivot in unison about said posts such that said gripping portions remain in substantially equidistant relation from the center reference point regardless of a degree of rotation of said followers.

14. The device of claim 13 wherein each pin is removably attached to each of said followers.

15. The device of claim 13 wherein each of said pins is dimensioned to grip an inside diameter of a bore.

16. The device of claim 13 further comprising a housing extending from said base, said housing comprising at least one side wall and a cover.

17. The device of claim 16 wherein each of said cover and said base comprise an opening therethrough, said opening having a centerline that is substantially aligned with the center reference point.

18. The device of claim 13 wherein said actuator comprises a gear rotationally attached to one of said linkages and a drive screw disposed in communication with said gear.

* * * * *